United States Patent
Burks et al.

(10) Patent No.: US 11,265,667 B2
(45) Date of Patent: Mar. 1, 2022

(54) AUDIO PROFILE ADJUSTMENTS

(71) Applicant: HEWLETT-PACKARD DEVELOPMENT COMPANY, L.P., Spring, TX (US)

(72) Inventors: Ricky Thomas Burks, Spring, TX (US); Tony Moon, Spring, TX (US); Alan Man Pan Tam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/638,225

(22) PCT Filed: Nov. 7, 2017

(86) PCT No.: PCT/US2017/060876
§ 371 (c)(1),
(2) Date: Feb. 11, 2020

(87) PCT Pub. No.: WO2019/094017
PCT Pub. Date: May 16, 2019

(65) Prior Publication Data
US 2020/0367004 A1    Nov. 19, 2020

(51) Int. Cl.
*H04R 5/02* (2006.01)
*H04S 7/00* (2006.01)
(Continued)

(52) U.S. Cl.
CPC ............ *H04S 7/302* (2013.01); *G06F 1/1681* (2013.01); *G06F 3/0346* (2013.01); *H04R 3/04* (2013.01);
(Continued)

(58) Field of Classification Search
CPC ...... H04S 7/302; G06F 1/1681; G06F 3/0346; H04R 3/04
See application file for complete search history.

(56) References Cited

U.S. PATENT DOCUMENTS 9,065,410 B2    6/2015  Holman et al.
9,706,303 B2    7/2017  Grokop
(Continued)

FOREIGN PATENT DOCUMENTS

CN    1761303 A      4/2006
CN    102348147 A    2/2012

OTHER PUBLICATIONS

Colaner, S., Lenovo Debuts Yoga Successor and Oddball, Oct. 20, 2015, http://www.tomshardware.co.uk/lenovo-yoga-900-yoga-900-home,news-51549.html.

*Primary Examiner* — Simon King
(74) *Attorney, Agent, or Firm* — Brooks, Cameron & Huebsch PLLC

(57) ABSTRACT

Example implementations relate to Speaker Orientation Audio Profile Adjustments. In some examples, a mobile computing device may include a first housing coupled to a second housing, wherein the first housing and the second housing are articulable to a plurality of configurations. The mobile computing device may include a plurality of speakers. The mobile computing device may include a sensor to detect an orientation of each of the plurality of speakers. The mobile computing device may include a memory resource comprising executable instructions to adjust an audio profile of each of the plurality of speakers based on the detected orientation of each of the plurality of speakers.

15 Claims, 3 Drawing Sheets

(51) Int. Cl.
    *G06F 1/16*       (2006.01)
    *G06F 3/0346*    (2013.01)
    *H04R 3/04*      (2006.01)

(52) U.S. Cl.
    CPC ....... *H04R 2499/11* (2013.01); *H04S 2400/13* (2013.01)

(56) References Cited

U.S. PATENT DOCUMENTS

| | | |
|---|---|---|
| 9,706,304 B1 | 7/2017 | Kelso et al. |
| 2006/0161278 A1 | 7/2006 | Maeda |
| 2008/0146289 A1 | 6/2008 | Korneluk et al. |
| 2013/0188804 A1 | 7/2013 | Burgett |
| 2015/0177791 A1* | 6/2015 | Sasaki ................ A45C 13/30 361/679.55 |
| 2015/0220302 A1 | 8/2015 | Kallai |
| 2016/0057555 A1* | 2/2016 | Schuster ............... H03G 5/165 381/59 |
| 2016/0162255 A1* | 6/2016 | Nishimura ............. H04R 5/04 381/303 |
| 2017/0055074 A1 | 2/2017 | Tao et al. |

\* cited by examiner

AUDIO PROFILE ADJUSTMENTS

BACKGROUND

Computing devices are prevalent in the human environment. Computing devices are relied on for work, entertainment, communication, and many other purposes. A computing device may be utilized to present content of various different forms. For example, a computing device may include an audio output device, such as a speaker, to output audio content.

DETAILED DESCRIPTION

Figure 1:
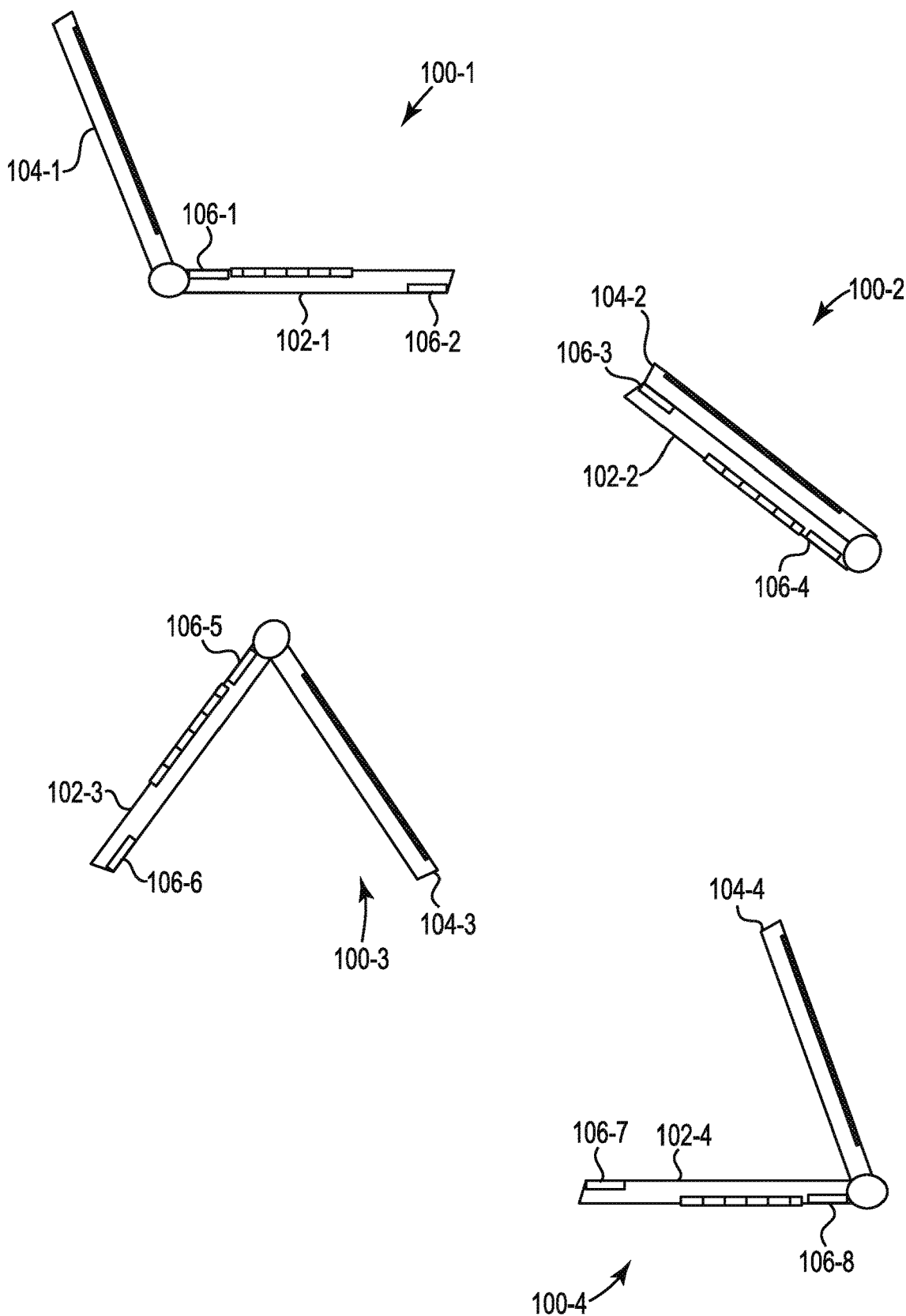
FIG. 1 illustrates an example of a mobile computing device to enable speaker orientation audio profile adjustments, consistent with the disclosure.

A computing device may include a processing resource such as electronic circuitry to execute instructions stored on machine-readable medium to perform various operations. Computing devices may be static or mobile.

A static computing device may include a computing device designed for regular use in a single location. For example, a static computing device may include a desktop computer or other computing device that is utilized in a single location.

A mobile computing device may include a portable computing device that is designed to be used in a variety of settings and to be transported between settings with relatively little effort. A mobile computing device may combine inputs, outputs, components, and capabilities that are otherwise separate in a static computing device. A mobile computing device may include a laptop computer, smartphone, other smart device, a tablet computer, a personal digital assistant, a convertible computing device, etc.

A convertible computing device may include a computing device that is convertible between a plurality of physical configurations. For example, a convertible computing device may include a first housing and a second housing that are articulable about a hinge to achieve various physical configurations of the convertible computing device. Unlike a dedicated laptop computing device, each of the housings of the convertible computing device may rotate substantially three hundred and sixty degrees about a rotational axis passing through a center of the hinge mechanism to achieve the various physical configurations of the convertible computing device.

The convertible computing device may be functionally convertible for use as a traditional laptop computing device accepting input from an integrated physical keyboard and/or a touchscreen or as a tablet computing device accepting input from just the touchscreen. The convertible laptop may utilize distinct Basic Input/Output System (BIOS) modes that control the allowable or recognized inputs and/or outputs associated with the traditional laptop and tablet computing device use modes. The utilized BIOS mode may be selected based on the physical configuration of the convertible computing device.

A convertible computing device may include audio output devices. For example, the convertible computing device may include speakers. Speakers may include transducers that convert electronic signals such as electromagnetic waves into sound waves. The speakers may receive audio input, for example, from an audio codec of the convertible computing device. The audio input may be converted to sound waves by speaker components such as a cone, an electromagnetic coil, a permanent magnet, etc.

The speakers of a convertible computing device may be mounted to fixed positions on and/or within the convertible computing device. For example, the positions of the speakers on and/or within the convertible computing device may not be altered by the physical configuration of the convertible computing device. However, the position of the speakers relative to a user may be altered by the physical configuration. As such, the perception of the sound waves generated by the speakers and/or the sound waves generated by the speakers themselves may be altered by the physical configuration of the convertible computing device. An audio experience may be negatively impacted by an alteration of the soundwaves.

In contrast, examples of the present disclosure may include mobile computing devices, machine-readable media, and methods to perform speaker orientation audio profile adjustments. For example, a mobile computing device may include a first housing coupled to a second housing, wherein the first housing and the second housing are articulable to a plurality of configurations. The mobile device may include a plurality of speakers. The mobile device may include a sensor to detect the respective orientation of each of the plurality of speakers. The mobile device may include a memory resource comprising executable instructions to adjust the audio profile of each of the plurality of speakers based on the respective detected orientation of the speakers.

FIG. 1 illustrates an example of a mobile computing device 100-1, 100-2, 100-3, 100-4 to enable speaker orientation audio profile adjustments, consistent with the disclosure. The mobile computing device 100-1, 100-2, 100-3, 100-4 may be a convertible computing device. For example, the mobile computing device 100-1, 100-2, 100-3, 100-4 may be physically convertible between use as a traditional laptop computing device, accepting input from an integrated physical keyboard, and/or a touchscreen or as a tablet computing device accepting input from just the touchscreen.

The computing device 100-1, 100-2, 100-3, 100-4 may include a plurality of connected housings (e.g., 102-1, 102-2, 102-3, 102-4, 104-1, 104-2, 104-3, 104-4). For example, the computing device 100-1, 100-2, 100-3, 100-4 may include a first housing 102-1, 102-2, 102-3, 102-4. The first housing 102-1, 102-2, 102-3, 102-4 may include a housing containing the computing portion of the computing device 100-1, 100-2, 100-3, 100-4, The computing portion may include the processing resource (e.g., a central processing unit (CPU), a graphics processing unit (GPU), etc.), a memory resource, an input/out port, and/or a battery. The computing portion may include the components that enable the operation of the operating system and applications of the computing device 100-1, 100-2, 100-3, 100-4. The computing portion may include the hardware that executes commands and generates outputs for the computing device 100-1, 100-2, 100-3, 100-4.

The first housing 102-1, 102-2, 102-3, 102-4 may include an integrated keyboard. The integrated keyboard may include a physical keyboard and/or a virtual keyboard that is integrated with the first housing 102-1, 102-2, 102-3, 102-4. For example, an integrated keyboard may include a keyboard that is contained on top of and/or partially within the first housing 102-1, 102-2, 102-3, 102-4. The integrated keyboard may not include a releasable connection with the first housing 102-1, 102-2, 102-3, 102-4 and/or the second housing 104-1, 104-2, 104-3, 104-4 but rather may be inset to a face of the first housing 102-1, 102-2, 102-3, 102-3. The integrated keyboard may utilize power supplied through the first housing 102-1, 102-2, 102-3, 102-4 and may include a wired connection to the first housing 102-1, 102-2, 102-3, 102-4.

The first housing 102-1, 102-2, 102-3, 102-4 may include a functional face. A functional face of the first housing 102-1, 102-2, 102-3, 102-4 may be the surface of the first housing 102-1, 102-2, 102-3, 102-4 including the integrated keyboard. The functional face of the first housing 102-1, 102-2, 102-3, 102-4 may be the surface of the first housing 102-1, 102-2, 102-3, 102-4 that is keyed with mechanically actuatable or virtually actuatable keys that correspond to particular alphanumeric and specific command inputs.

The computing device 100-1, 100-2, 100-3, 100-4 may include a second housing 104-1, 104-2, 104-3, 104-4. The second housing 104-1, 104-2, 104-3, 104-4 may include hardware associated with generating a displayed image of a user interface. The second housing 104-1, 104-2, 104-3, 104-4 may also include hardware associated with a touchscreen user interface.

The second housing 104-1, 104-2, 104-3, 104-4 may include an integrated display. An integrated display may include a display capable of displaying images of a graphical user interface. The integrated display may be integrated with the second housing 104-1, 104-2, 104-3, 104-4. The hardware associated with generating a displayed image may be contained within the second housing 104-1, 104-2, 104-3, 104-4. A screen portion of a display where the images are manifested may be visible on one face of the second housing 104-1, 104-2, 104-3, 104-4. The integrated display may be overlaid with a user input detecting device such as a touchscreen. The integrated display may not include a releasable connection with the second housing 104-1, 104-2, 104-3, 104-4 and/or the first housing 102-1, 102-2, 102-3, 102-4 but rather may be inset to a face of the second housing 104-1, 104-2, 104-3, 104-4. The integrated display may utilize power supplied through the second housing 104-1, 104-2, 104-3, 104-4 and may include a wired connection to the second housing 104-1, 104-2, 104-3, 104-4 and/or first housing 102-1, 102-2, 102-3, 102-4. The integrated display may be a physically integrated part of the computing device 100-1, 100-2, 100-3, 100-4.

The second housing 104-1, 104-2, 104-3, 104-4 may include a functional face. A functional face of the second housing 104-1, 104-2, 104-3, 104-4 may include a surface that includes the integrated display. For example, the functional face of the second housing 104-1, 104-2, 104-3, 104-4 may include a surface upon and/or through which an electronic visual display can be viewed. In some examples, the functional face of the second housing 104-1, 104-2, 104-3, 104-4 may include a touchscreen input receiving device laid over the electronic visual display.

The first housing 102-1, 102-2, 102-3, 102-4 and the second housing 104-1, 104-2, 104-3, 104-4 may be coupled. The coupling between the first housing 102-1, 102-2, 102-3, 102-4 and the second housing 104-1, 104-2, 104-3, 104-4 may be designed to be a substantially permanent connection that is not designed to be readily and/or repeatedly disconnected. For example, the coupling may accommodate wiring between connection points in the first housing 102-1, 102-2, 102-3, 102-4 and connection points in the second housing 104-1, 104-2, 104-3, 104-4 that is not releasable from the connection points in either housing without damaging the computing device 100-1, 100-2, 100-3, 100-4 (e.g., wiring soldered to circuitry at the connection points).

The connection between the first housing 102-1, 102-2, 102-3, 102-4 and the second housing 104-1, 104-2, 104-3, 104-4 may include a hinge mechanism. The first housing 102-1, 102-2, 102-3, 102-4 and the second housing 104-1, 104-2, 104-3, 104-4 may be rotatable about the hinge mechanism. Rotation of the first housing 102-1, 102-2, 102-3, 102-4 and the second housing 104-1, 104-2, 104-3, 104-4 about a rotational axis passing through a center of the hinge mechanism may alter an orientation of the first housing 102-1, 102-2, 102-3, 102-4 and the second housing 104-1, 104-2, 104-3, 104-4 with respect to each other by altering an angle between the first housing 102-1, 102-2, 102-3, 102-4 and the second housing 104-1, 104-2, 104-3, 104-4.

The first housing 102-1, 102-2, 102-3, 102-4 and the second housing 104-1, 104-2, 104-3, 104-4 may be articulable about the hinge mechanism to achieve a plurality of configurations. For example, the first housing 102-1, 102-2, 102-3, 102-4 and the second housing 104-1, 104-2, 104-3, 104-4 may be articulable about the hinge mechanism to achieve a plurality of configurations. Each of the plurality of configurations may correspond to a range of positional relationships between the first housing 102-1, 102-2, 102-3, 102-4 and the second housing 104-1, 104-2, 104-3, 104-4 quantified using angles there between. The angles may be defined relative to a vertex. The vertex may include the hinge mechanism. The plurality of configurations may correspond to the positional relationship between the first housing 102-1, 102-2, 102-3, 102-4 and the second housing 104-1, 104-2, 104-3, 104-4, the positional relationship between the user and the functional faces of the first housing 102-1, 102-2, 102-3, 102-4 and the second housing 104-1, 104-2, 104-3, 104-4, and/or the positional relationship between the work surface and the functional faces of the first housing 102-1, 102-2, 102-3, 102-4 and the second housing 104-1, 104-2, 104-3, 104-4.

For example, a laptop configuration (e.g., an example of a convertible computing device that is in an orientation that may be associated with a laptop configuration is illustrated for convertible computing device 100-1) may be associated with an angle between the functional side of the first housing 102-1, 102-2, 102-3, 102-4 and the functional side of the second housing 104-1, 104-2, 104-3, 104-4 being between zero degrees and one hundred and eighty degrees.

In another example, a tablet configuration (e.g., an example of a convertible computing device that is in an orientation that may be associated with a tablet configuration is illustrated for convertible computing device 100-2) may be associated with an angle between the functional side of the first housing 102-1, 102-2, 102-3, 102-4 and the functional face of the second housing 104-1, 104-2, 104-3, 104-4 being greater than three hundred and fifteen degrees and/or a functional face of the first housing 102-1, 102-2, 102-3, 102-4 facing a work surface.

In another example, a tent configuration (e.g., an example of a convertible computing device that is in an orientation that may be associated with a tent configuration is illustrated for convertible computing device 100-3) may be associated with an angle between the functional face of the first housing 102-1, 102-2, 102-3, 102-4 and the functional face of the second housing 104-1, 104-2, 104-3, 104-4 being between one hundred and eighty degrees and three hundred and fifteen degrees with the functional face of the first housing 102-1, 102-2, 102-3, 102-4 and the functional face of the second housing 104-1, 104-2, 104-3, 104-4 facing away from the work surface.

In another example, a presentation configuration (e.g., an example of a convertible computing device that is in an orientation that may be associated with a presentation configuration is illustrated for convertible computing device 100-4) may be associated with an angle between the functional face of the first housing 102-1, 102-2, 102-3, 102-4 and the functional face of the second housing 104-1, 104-2, 104-3, 104-4 being between one hundred and eighty degrees and three hundred and fifteen degrees with the functional face of the first housing 102-1, 102-2, 102-3, 102-4 facing the work surface and the functional face of the second housing 104-1, 104-2, 104-3, 104-4 facing away from the work surface.

The convertible computing device 100-1, 100-2, 100-3, 100-4 may include a plurality of integrated speakers 106-1, 106-2, 106-3, 106-4, 106-5, 106-6, 106-7, 106-8. The illustrated locations of the plurality of integrated speakers 106-1, 106-2, 106-3, 106-4, 106-5, 106-6, 106-7, 106-8 are non-limiting examples of possible locations. The plurality of integrated speakers 106-1, 106-2, 106-3, 106-4, 106-5, 106-6, 106-7, 106-8 may be integrated with the first housing 102-1, 102-2, 102-3, 102-4 and/or integrated with the second housing 104-1, 104-2, 104-3, 104-4.

For example, the plurality of integrated speakers 106-1, 106-2, 106-3, 106-4, 106-5, 106-6, 106-7, 106-8 may be fixed on and/or partially within the first housing 102-1, 102-2, 102-3, 102-4 and/or fixed on and/or partially within the second housing 104-1, 104-2, 104-3, 104-4. The plurality of speakers 106-1, 106-2, 106-3, 106-4, 106-5, 106-6, 106-7, 106-8 may be mounted on a functional face, a face opposing a functional face, an edge between the functional face and the face opposing the functional face, and/or any other location on the convertible computing device 100-1, 100-2, 100-3, 100-4. Additionally, each of the above described faces and/or locations of the convertible computing device 100-1, 100-2, 100-3, 100-4 may have a plurality of speakers thereupon.

A speaker may generate and emit soundwaves. The soundwaves may pass away from the speaker and/or out of the convertible computing device 100-1, 100-2, 100-3, 100-4. A speaker may be characterized as facing a direction that corresponds to the direction in which the speaker is emitting the soundwaves. The plurality of speakers 106-1, 106-2, 106-3, 106-4, 106-5, 106-6, 106-7, 106-8 may face various directions.

As described above, the plurality of speakers 106-1, 106-2, 106-3, 106-4, 106-5, 106-6, 106-7, 106-8 may have fixed positions on and/or within the first housing 102-1, 102-2, 102-3, 102-4 and/or the second housing 104-1, 104-2, 104-3, 104-4. As such, the position of the plurality of speakers 106-1, 106-2, 106-3, 106-4, 106-5, 106-6, 106-7, 106-8 may be fixed relative to the first housing 102-1, 102-2, 102-3, 102-4 and/or the second housing 104-1, 104-2, 104-3, 104-4 that they are fixed to. However, as described above, the first housing 102-1, 102-2, 102-3, 102-4 and the second housing 104-1, 104-2, 104-3, 104-4 are articulable to a plurality of configurations. As such, the position of the plurality of speakers 106-1, 106-2, 106-3, 106-4, 106-5, 106-6, 106-7, 106-8 may be changed relative to the housing that they are not fixed to, relative to a user, relative to a work surface, and relative to each other.

An audio experience may include an experience of a user in hearing the sound waves produced by the plurality of speakers 106-1, 106-2, 106-3, 106-4, 106-5, 106-6, 106-7, 106-8. As the first housing 102-1, 102-2, 102-3, 102-4 and/or the second housing 104-1, 104-2, 104-3, 104-4 are articulated into different orientations, the communication of the soundwaves output from the plurality of speakers 106-1, 106-2, 106-3, 106-4, 106-5, 106-6, 106-7, 106-8 may be altered or interfered with. As a result, an audio experience of a user may be altered or interfered with. In some examples, the audio experience may be degraded by the alteration or interference. A degraded audio experience may include unintended muffling, absorption, reflection, diffusion, echo, reverberation, vibration, volume reduction, volume increase, and such of the sound waves. The degraded audio experience may result in a less audible, less true to a source recording, less comfortable to listen to, and less immersive audio experience.

In some examples, each of the plurality of speakers 106-1, 106-2, 106-3, 106-4, 106-5, 106-6, 106-7, 106-8 may be associated with an audio profile. As used herein, an audio profile may include a specific equalization definition for boosting and attenuating certain frequencies of a given audio signal when it is produced by the speaker. For example, the audio profile may define the equalizer settings for an output produced by the speaker including energy levels associated with various frequencies of the audio signal. Each of a plurality of sound frequencies, measured in hertz (Hz) may be associated with a decibel (dB) level in an audio profile. The higher the decibel level for a particular frequency, the more pronounced the particular frequency will be in an audio signal generated by the speaker and vice versa.

In some examples, audio frequencies between 20 Hz and 500 Hz may be bass frequencies. In some examples, audio frequencies between 500 Hz and 4 kHz may be mid-range frequencies. In some examples, audio frequencies between 4 kHz up to 20 kHz may be treble frequencies.

The convertible computing device 100-1, 100-2, 100-3, 100-4 may include a sensor. The sensor may be a sensor to detect the respective orientation of each of the plurality of speakers 106-1, 106-2, 106-3, 106-4, 106-5, 106-6, 106-7, 106-8, For example, the convertible computing device 100-1, 100-2, 100-3, 100-4 may include an accelerometer. An accelerometer may include a device that measures proper acceleration or rate of change of velocity of a body in its own instantaneous rest frame. The accelerometer may detect a magnitude and/or direction of proper acceleration as a vector quantity that may be utilized to detect an orientation.

In some examples, the convertible computing device 100-1, 100-2, 100-3, 100-4 may include an accelerometer in the first housing 102-1, 102-2, 102-3, 102-4 and an accelerometer in the second housing 104-1, 104-2, 104-3, 104-4. The data collected from the accelerometer in the first housing 102-1, 102-2, 102-3, 102-4 and the accelerometer in the second housing 104-1, 104-2, 104-3, 104-4 may be utilized to determine the orientation of each of the plurality of speakers 106-1, 106-2, 106-3, 106-4, 106-5, 106-6, 106-7, 106-8 on or within the first housing 102-1, 102-2, 102-3, 102-4 and the second housing 104-1, 104-2, 104-3, 104-4.

Additionally, the convertible computing device 100-1, 100-2, 100-3, 100-4 may include a gyroscope. A gyroscope may include a device that utilizes the Earth's gravity to help determine an orientation. The gyroscope may utilize a freely-rotating disk or rotor mounted onto a spinning axis in the center of a larger and/or more stable axis. As the axis turns, the rotor or disk may remain stationary to indicate a central gravitational pull indicating which way is "down" relative to the Earth.

For example, the convertible computing device 100-1, 100-2, 100-3, 100-4 may include a gyroscope in the first housing 102-1, 102-2, 102-3, 102-4 and a gyroscope in the second housing 104-1, 104-2, 104-3, 104-4. The data collected from the gyroscope in the first housing 102-1, 102-2, 102-3, 102-4 and the gyroscope in the second housing 104-1, 104-2, 104-3, 104-4 may be utilized to determine the orientation of each of the plurality of speakers 106-1, 106-2, 106-3, 106-4, 106-5, 106-6, 106-7, 106-8 on or within the first housing 102-1, 102-2, 102-3, 102-4 and the second housing 104-1, 104-2, 104-3, 104-4.

The orientation of each of the plurality of speakers 106-1, 106-2, 106-3, 106-4, 106-5, 106-6, 106-7, 106-8 may be determined relative to a work surface. The orientation of each of the plurality of speakers 106-1, 106-2, 106-3, 106-4, 106-5, 106-6, 106-7, 106-8 may be determined relative to the surface of the Earth. The orientation of a particular one of or a portion of the plurality of speakers 106-1, 106-2, 106-3, 106-4, 106-5, 106-6, 106-7, 106-8 may be determined relative to a second particular one or a second portion of the plurality of speakers 106-1, 106-2, 106-3, 106-4, 106-5, 106-6, 106-7, 106-8. The orientation of each of the plurality of speakers 106-1, 106-2, 106-3, 106-4, 106-5, 106-6, 106-7, 106-8 may be determined relative to an opposing housing that the speaker is not fixed to. The orientation of each of the plurality of speakers 106-1, 106-2, 106-3, 106-4, 106-5, 106-6, 106-7, 106-8 may be determined relative to a user or a surface of the convertible computing device 100-1, 100-2, 100-3, and 100-4 that is active to and/or is actively receiving input from a user.

Determining the orientation of each of the plurality of speakers 106-1, 106-2, 106-3, 106-4, 106-5, 106-6, 106-7, 106-8 may include determining an direction of a sound wave output from each of the plurality of speakers 106-1, 106-2, 106-3, 106-4, 106-5, 106-6, 106-7, 106-8. That is, determining the orientation of each of the plurality of speakers 106-1, 106-2, 106-3, 106-4, 106-5, 106-6, 106-7, 106-8 may include determining a direction and/or angle that each of the plurality of speakers 106-1, 106-2, 106-3, 106-4, 106-5, 106-6, 106-7, 106-8 is outputting a soundwave toward. That is, determining the orientation of each of the plurality of speakers 106-1, 106-2, 106-3, 106-4, 106-5, 106-6, 106-7, 106-8 may include determining a direction that each of the plurality of speakers 106-1, 106-2, 106-3, 106-4, 106-5, 106-6, 106-7, 106-8 is facing toward. Determining the orientation of each of the plurality of speakers 106-1, 106-2, 106-3, 106-4, 106-5, 106-6, 106-7, 106-8 may include determining an angle between each of the plurality of speakers 106-1, 106-2, 106-3, 106-4, 106-5, 106-6, 106-7, 106-8 and the plane of the horizon and/or work surface.

Determining the orientation of each of the plurality of speakers 106-1, 106-2, 106-3, 106-4, 106-5, 106-6, 106-7, 106-8 may include determining whether an object, another speaker, a housing, or another soundwave will interfere with the sound wave produced by each of the plurality of speakers 106-1, 106-2, 106-3, 106-4, 106-5, 106-6, 106-7, 106-8. For example, determining the orientation of each of the plurality of speakers 106-1, 106-2, 106-3, 106-4, 106-5, 106-6, 106-7, 106-8 may include determining whether a second speaker, an output of the second speaker, a work surface, a user, and/or a housing of the convertible computing device will obstruct or otherwise interfere with or alter the sound wave output of a first speaker of the plurality of speakers 106-1, 106-2, 106-3, 106-4, 106-5, 106-6, 106-7, 106-8.

The orientation of each of the plurality of speakers 106-1, 106-2, 106-3, 106-4, 106-5, 106-6, 106-7, 106-8 may be determined based on data from an accelerometer and/or a gyroscope. For example, each of the plurality of speakers 106-1, 106-2, 106-3, 106-4, 106-5, 106-6, 106-7, 106-8 may be associated with an accelerometer and/or a gyroscope. As such, the orientation of each of the plurality of speakers 106-1, 106-2, 106-3, 106-4, 106-5, 106-6, 106-7, 106-8 may be determined from the data from the accelerometer and/or the gyroscope associated with each of the plurality of speakers 106-1, 106-2, 106-3, 106-4, 106-5, 106-6, 106-7, 106-8.

In an example, a first housing 102-1, 102-2, 102-3, 102-4 and second housing 104-1, 104-2, 104-3, 104-4 may include an accelerometer and/or a gyroscope. A first portion of the plurality of speakers 106-1, 106-2, 106-3, 106-4, 106-5, 106-6, 106-7, 106-8 may be located on or within the first housing 102-1, 102-2, 102-3, 102-4. A second portion of the plurality of speakers 106-1, 106-2, 106-3, 106-4, 106-5, 106-6, 106-7, 106-8 may be located on or within a second housing 104-1, 104-2, 104-3, 104-4. The orientation of the first portion of the plurality of speakers 106-1, 106-2, 106-3, 106-4, 106-5, 106-6, 106-7, 106-8 may be determined based on the accelerometer and/or a gyroscope within the first housing 102-1, 102-2, 102-3, 102-4. The orientation of the second portion of the plurality of speakers 106-1, 106-2, 106-3, 106-4, 106-5, 106-6, 106-7, 106-8 may be determined based on the accelerometer and/or a gyroscope within the second housing 104-1, 104-2, 104-3, 104-4. That is, the orientation of each portion of the plurality of speakers 106-1, 106-2, 106-3, 106-4, 106-5, 106-6, 106-7, 106-8 may be determined based on data from an accelerometer and/or a gyroscope within the same housing as the respective portion of the plurality of speakers 106-1, 106-2, 106-3, 106-4, 106-5, 106-6, 106-7, 106-8. Additionally, the orientation of each portion of the plurality of speakers 106-1, 106-2, 106-3, 106-4, 106-5, 106-6, 106-7, 106-8 may be determined based on data from an accelerometer and/or a gyroscope in a different housing as the respective portion of the plurality of speakers 106-1, 106-2, 106-3, 106-4, 106-5, 106-6, 106-7, 106-8. For example, the orientation of a different housing that is opposite the housing containing the portion of the plurality of speakers 106-1, 106-2, 106-3, 106-4, 106-5, 106-6, 106-7, 106-8 may be utilized to determine whether the different housing will interfere with the sound wave generated by the portion of the plurality of speakers 106-1, 106-2, 106-3, 106-4, 106-5, 106-6, 106-7, 106-8.

The convertible computing device 100-1, 100-2, 100-3, 100-4 may include a memory resource. The memory resource may be utilized to stored instructions. The instructions may be executable by the processing resource to perform various operations. For example, the memory resource may include instructions executable to receive the orientation of each of the plurality of speakers 106-1, 106-2, 106-3, 106-4, 106-5, 106-6, 106-7, 106-8 from the sensor. The memory resource may include instructions executable to determine an adjustment to the audio profile of each of the plurality of speakers 106-1, 106-2, 106-3, 106-4, 106-5, 106-6, 106-7, 106-8.

The adjustment to the audio profile of each of the plurality of speakers 106-1, 106-2, 106-3, 106-4, 106-5, 106-6, 106-7, 106-8 may be based on the orientation of each of the plurality of speakers 106-1, 106-2, 106-3, 106-4, 106-5, 106-6, 106-7, 106-8. For example, the adjustment to the audio profile of a first portion of the plurality of speakers 106-1, 106-2, 106-3, 106-4, 106-5, 106-6, 106-7, 106-8 may be determined based on the orientation of the first portion of speakers. In another example, the adjustment to the audio profile of the first portion of the plurality of speakers 106-1, 106-2, 106-3, 106-4, 106-5, 106-6, 106-7, 106-8 may be based on the orientation of the first portion of speakers and/or the orientation of another portion of the plurality of speakers 106-1, 106-2, 106-3, 106-4, 106-5, 106-6, 106-7, 106-8. A specific and/or unique adjustment to an audio profile may be determined for each speaker or each portion of speakers making up the plurality of speakers 106-1, 106-2, 106-3, 106-4, 106-5, 106-6, 106-7, 106-8.

The specific and/or unique adjustment to an audio profile may be determined based on a plurality of factory-preset speaker orientation-specific audio profile configurations for each of the plurality of speakers 106-1, 106-2, 106-3, 106-4, 106-5, 106-6, 106-7, 106-8. Alternatively, the specific and/or unique adjustment to an audio profile may be determined based on a plurality of user-configured speaker orientation-specific audio profile configurations for each of the plurality of speakers 106-1, 106-2, 106-3, 106-4, 106-5, 106-6, 106-7, 106-8.

For example, the convertible computing device 100-1, 100-2, 100-3, 100-4 may include a memory resource storing instructions executable by the processing resource to expose an equalizer to a user to facilitate a user to adjust and save speaker orientation-specific audio profile configurations for each of the plurality of speakers 106-1, 106-2, 106-3, 106-4, 106-5, 106-6, 106-7, 106-8. As used herein, an equalizer may include instructions executable by the processing resource to generate a configurable graphical representation that may be utilized to modify the energy of specific frequency bands of an audio signal as it is reproduced by the plurality of speakers 106-1, 106-2, 106-3, 106-4, 106-5, 106-6, 106-7, 106-8 of the convertible computing device 100-1, 100-2, 100-3, 100-4.

For example, the convertible computing device 100-1, 100-2, 100-3, 100-4 may include a memory resource storing instructions executable by the processing resource to conduct a training session. A training session may include exposing an adjustable equalizer to a user to configure a plurality of orientation-specific audio profiles of each of the plurality of speakers 106-1, 106-2, 106-3, 106-4, 106-5, 106-6, 106-7, 106-8 as the plurality of speakers 106-1, 106-2, 106-3, 106-4, 106-5, 106-6, 106-7, 106-8 are placed in a plurality of different orientations.

The specific and/or unique adjustment to an audio profile of each of the plurality of speakers 106-1, 106-2, 106-3, 106-4, 106-5, 106-6, 106-7, 106-8 may be an adjustment that alters the existing audio profile to a corresponding orientation-specific audio profile for the specific detected orientation of each of the plurality of speakers 106-1, 106-2, 106-3, 106-4, 106-5, 106-6, 106-7, 106-8. For example, the adjustment may be an adjustment that modifies the audio profile of each of the plurality of speakers 106-1, 106-2, 106-3, 106-4, 106-5, 106-6, 106-7, 106-8 to match the orientation-specific audio profile for each of the plurality of speakers 106-1, 106-2, 106-3, 106-4, 106-5, 106-6, 106-7, 106-8 in the detected orientation.

The convertible computing device 100-1, 100-2, 100-3, 100-4 may include a memory resource storing instructions executable by the processing resource to adjust the audio profile of each of the plurality of speakers 106-1, 106-2, 106-3, 106-4, 106-5, 106-6, 106-7, 106-8. As described above, the adjustment applied to the audio profile may be based on the detected orientation of each of the plurality of speakers 106-1, 106-2, 106-3, 106-4, 106-5, 106-6, 106-7, 106-8.

The adjustment to the audio profile may include an adjustment to the volume level of each of the plurality of speakers 106-1, 106-2, 106-3, 106-4, 106-5, 106-6, 106-7, 106-8. For example, the adjustment may include an increase or a decrease in the volume associated with an audio signal being output by the plurality of speakers 106-1, 106-2, 106-3, 106-4, 106-5, 106-6, 106-7, 106-8. The increase or the decrease in volume may be measured in and/or specified in decibel units.

The adjustment to the audio profile may include an adjustment to the bass frequency of each of the plurality of speakers 106-1, 106-2, 106-3, 106-4, 106-5, 106-6, 106-7, 106-8. For example, the adjustment may include an increase and/or a decrease in the energy of the 20 Hz and 500 Hz audio frequency range output by the plurality of speakers 106-1, 106-2, 106-3, 106-4, 106-5, 106-6, 106-7, 106-8 for an audio signal.

The adjustment to the audio profile may include an adjustment to the mid-range frequency of each of the plurality of speakers 106-1, 106-2, 106-3, 106-4, 106-5, 106-6, 106-7, 106-8, For example, the adjustment may include an increase and/or a decrease in the energy of the 500 Hz and 4 kHz audio frequency output by the plurality of speakers 106-1, 106-2, 106-3, 106-4, 106-5, 106-6, 106-7, 106-8 for an audio signal.

The adjustment to the audio profile may include an adjustment to the treble frequency of each of the plurality of speakers 106-1, 106-2, 106-3, 106-4, 106-5, 106-6, 106-7, 106-8. For example, the adjustment may include an increase and/or a decrease in the energy of the 4 kHz up to 20 kHz audio frequency output by the plurality of speakers 106-1, 106-2, 106-3, 106-4, 106-5, 106-6, 106-7, 106-8 for an audio signal.

In an example, illustrated by convertible computing device 100-1, a sensor may detect that an orientation of a speaker 106-1 is substantially parallel to a work surface and/or a plane of the horizon. The sensor may detect that the outputting face of the speaker 106-1 is facing away from or opposite to the work surface and/or plane of the horizon. The outputting face of the speaker 106-1 may include the cone surface and/or the surface of the speaker 106-1 where the soundwaves exit the speaker 106-1 and enter the environment.

The sensor may detect the orientation of the speaker 106-1 relative to the orientation of the first housing 104-1. For example, the sensor may detect that the angle between the speaker 106-1 and the functional side of the first housing 104-1, about a vertex at the hinge portion connecting the first housing 104-1 and second housing 102-1, is between ninety degrees and one hundred and eighty degrees. As such, the orientation of the speaker 106-1 may be outputting sound waves upward and away relative to the work surface and the sound may be output toward a user and/or be partially reflected off of the functional side of the first housing 104-1 toward the user. In such an example, the audio profile of the speaker 106-1 may be adjusted by decreasing the volume since the soundwaves produced by the speaker 106-1 may be perceived directly by a user without u ling or interference by other objects and/or sound waves.

In the example, the audio profile of the speaker 106-1 may be adjusted by increasing the energy of the treble frequencies output by the speaker 106-1 and/or decreasing the energy of the bass frequencies output by the speaker 106-1. The bass frequencies may be perceived as a deep and rich bass when they are reflected off the work surface. However, the bass frequencies may be perceived as a shallow vibration when they are not reflected off of a work surface. In contrast, the treble frequencies may be perceived as muffled and/or echoes when they are reflected off of a work surface. However, the treble frequencies may be perceived as sharp and crisp when they are not reflected off of a work surface. As such, adjusting the audio profile of the speaker 106-1 to increase the treble frequency and decrease the bass frequency based on the orientation may increase the audio experience by biasing the speaker 106-1 to a treble audio profile. The detected orientation of the speaker 106-1 may produce relatively less distortion of the treble frequencies than bass frequencies.

In an example, a sensor may detect that an orientation of a speaker 106-2 is substantially parallel to a work surface and/or a plane of the horizon. The sensor may detect that the outputting face of the speaker 106-2 is facing toward the work surface and/or plane of the horizon. The sensor may detect that the outputting face of the speaker 106-2 is t facing away from the outputting face of the speaker 106-1. For example, the outputting face of the speaker 106-2 may be orientated one hundred and eighty degrees from the outputting face of the speaker 106-1.

The sensor may detect that the orientation of the speaker 106-2 relative to the orientation of the first housing 104-1, For example, the sensor may detect that the angle between the outputting face of the speaker 106-2 and the functional side of the first housing 104-1, about a vertex at the hinge portion connecting the first housing 104-1 and second housing 102-1, is between one hundred and eighty degrees and two hundred and seventy degrees. As such, the orientation of the speaker 106-2 may be outputting soundwaves downward relative to the work surface and the sound may be reflected off the work surface toward a user. In such an example, the audio profile of the speaker 106-2 may be adjusted by increasing the volume since the soundwaves produced by the speaker 106-2 may be muffled and/or interfered with by the work surface. In the example, the audio profile of the speaker 106-2 may be adjusted by decreasing the energy of the treble frequencies output by the speaker 106-2 and/or increasing the energy of the bass frequencies output by the speaker 106-2. As such, adjusting the audio profile of the speaker 106-2 to increase the bass frequency and decrease the treble frequency based on the orientation may increase the audio experience by biasing the speaker 106-2 to a bass audio profile. The detected orientation of the speaker 106-2 may produce relatively less distortion of the bass frequencies than treble frequencies.

In another example, illustrated by convertible computing device 100-2, a sensor may detect that an orientation of a speaker 106-3 is substantially parallel to a work surface and/or a plane of the horizon. The sensor may detect that the outputting face of the speaker 106-3 is facing away from or opposite to the work surface and/or plane of the horizon. The sensor may detect that the orientation of the speaker 106-3 relative to the orientation of the first housing 104-2. For example, the sensor may detect that the angle between the outputting face of speaker 106-3 and the functional side of the first housing 104-2, about a vertex at the hinge portion connecting the first housing 104-2 and second housing 102-2, is three hundred and sixty degrees. For example, the side of the first housing 104-2 that opposes the functional side of the first housing 104-2 may be resting against the outputting face of the speaker 106-3 and may be between the user and the speaker 106-3.

As such, the orientation of the speaker 106-3 may be outputting soundwaves upward and away relative to the work surface and the sound waves may be output toward and/or be partially reflected off of the side of the first housing 104-2 that is opposing the functional side of the first housing 104-2. In such an example, the audio profile of the speaker 106-3 may be adjusted by decreasing the volume since the speaker 106-1 may be closest to a user utilizing the touch screen interface on the first housing 104-2.

In the example, the audio profile of the speaker 106-3 may be adjusted by increasing the energy of the treble frequencies output by the speaker 106-3 and/or decreasing the energy of the bass frequencies output by the speaker 106-3, The sensor may detect that the orientation of the speaker 106-3 relative to the first housing 104-2 will result in the first housing interfering with the sound waves from the speaker 106-3. The particular treble frequencies associated with the energy increase may be adjusted to account for the interference of the first housing 104-2 with the sound waves generated by the speaker 106-3, Adjusting the audio profile of the speaker 106-3 to increase the treble frequency and decrease the bass frequency based on the orientation may increase the audio experience by biasing the speaker 106-3 to a treble audio profile. The detected orientation of the speaker 106-3 may produce relatively less distortion of the treble frequencies than base frequencies.

In an example, a sensor may detect that an orientation of a outputting face of a speaker 106-4 is substantially parallel to a work surface and/or a plane of the horizon. The sensor may detect that the orientation of the outputting face of the speaker 106-4 is facing toward the work surface and/or plane of the horizon. The sensor may detect that the orientation of the outputting face of the speaker 106-4 is facing away from the outputting face of the speaker 106-3. For example, the outputting face of the speaker 106-4 may be orientated substantially one hundred and eighty degrees from the outputting face of the speaker 106-3.

The sensor may detect the orientation of the speaker 106-4 relative to the orientation of the first housing 104-2. For example, the sensor may detect that the angle between the speaker 106-4 and the functional side of the first housing 104-2, about a vertex at the hinge portion connecting the first housing 104-2 and second housing 102-2, is between three hundred and fifteen degrees and three hundred and sixty degrees. As such, the speaker 106-4 may be outputting sound waves downward relative to the work surface and the sound may be reflected off the work surface toward a user. Or, if a user is holding the convertible computing device 100-2, the sound waves may reflect off the user's hand or other surfaces in the environment.

In such an example, the audio profile of the speaker 106-4 may be adjusted by increasing the volume since the soundwaves produced by the speaker 106-4 may be muffled and/or interfered with by the work surface or may be directed away from a user. In the example, the audio profile of the speaker 106-4 may be adjusted by decreasing the energy of the treble frequencies output by the speaker 106-4 and/or increasing the energy of the bass frequencies output by the speaker 106-4. As such, adjusting the audio profile of the speaker 106-4 to increase the bass frequency and decrease the treble frequency based on the orientation may increase the audio experience by biasing the speaker 106-4 to a bass audio profile. The detected orientation of the speaker 106-4 may produce relatively less distortion of the bass frequencies that of treble frequencies.

In another example, illustrated by convertible computing device 100-3, a sensor may detect that an orientation of an outputting face of speaker 106-5 rests at an angle relative to a work surface and/or a plane of the horizon. For example, the sensor may detect that an outputting surface of the speaker 106-5 rests at a ninety-degree to one hundred and forty-degree angle relative to a work surface and/or a plane of the horizon. The sensor may detect that the output of the speaker 106-5 is oriented facing angled away from the work surface and/or the plane of the horizon. That is, the sensor may detect that the output of the speaker 106-5 is facing angled away from a work surface or a plane of the horizon in an orientation that will direct sound waves along an axis that does not intersect with the work surface or a plane of the horizon.

The sensor may detect that the orientation of the speaker 106-5 relative to the orientation of the first housing 104-3. For example, the sensor may detect that the angle between the outputting face of the speaker 106-5 and the functional side of the first housing 104-3, about a vertex at the hinge portion connecting the first housing 104-3 and second housing 102-3, is between two hundred and seventy degrees and three hundred and fifty degrees. As such, the 106-5 may output soundwaves upward relative to the work surface. However, the sound may be output away from a user since the functional side of the first housing 104-3 is facing toward the user and the functional side of the first housing 104-3 is substantially opposite the outputting face of the speaker 106-5.

In such an example, the audio profile of the speaker 106-5 may be adjusted by increasing the volume since the soundwaves produced by the speaker 106-5 may be directed away from a user. In the example, the audio profile of the speaker 106-5 may be adjusted by increasing the energy of the treble frequencies output by the speaker 106-5 and/or decreasing the energy of the bass frequencies output by the speaker 106-5. The bass frequencies may not be reflected off the work surface since the output of speaker 106-5 is directed away from the work surface. As described above, the bass frequencies may be perceived as a shallow vibration when they are not reflected off of a work surface. As such, adjusting the audio profile of the speaker 106-5 to increase the treble frequency and decrease the bass frequency based on the orientation may increase the audio experience by biasing the speaker 106-5 to a treble audio profile. The detected orientation of the speaker 106-5 may produce relatively less distortion of the treble frequencies than the bass frequencies.

In an example, a sensor may detect that an outputting face of a speaker 106-6 rests at an angle relative to a work surface and/or a plane of the horizon. For example, the sensor may detect that an outputting face of a speaker 106-6 rests at a five-degree to eighty-five-degree angle relative to a work surface and/or a plane of the horizon.

The sensor may detect that the outputting face of the speaker is oriented at an angle facing toward the work surface and/or plane of the horizon. That is, the sensor may detect that the output of the speaker 106-6 is facing angled toward a work surface or a plane of the horizon in an orientation that will direct sound waves along an axis that does intersect with the work surface or a plane of the horizon.

The orientation may detect that the outputting face of the speaker 106-6 is orientated one hundred and eighty degrees from the outputting face of the speaker 106-5. The sensor may detect that the orientation of the speaker 106-6 relative to the orientation of the first housing 104-3. For example, the sensor may detect that the angle between the outputting face of the speaker 106-6 and the functional side of the first housing 104-3, about a vertex at the hinge portion connecting the first housing 104-3 and second housing 102-3, is between one two hundred and seventy degrees and three hundred and fifty degrees.

As such, the speaker 106-6 may be outputting sound waves downward relative to the work surface and the sound may be reflected off the work surface toward a user. The sensor may detect that the orientation of the speaker 106-6 relative to the first housing 104-3 will result in the first housing interfering with the sound waves from the speaker 106-6. The particular bass frequencies associated with the energy increase may be adjusted to account for the interference of the first housing 104-3 with the sound waves generated by the speaker 106-6. In such an example, the audio profile of the speaker 106-6 may be adjusted by decreasing the volume since the soundwaves produced by the speaker 106-2 may be directed toward the user. However, the volume may not be decreased as much as in other examples, since the soundwaves may reflect off of and/or be muffled by the first housing between the user and the speaker 106-6.

In these examples, the audio profile of the speaker 106-6 may be adjusted by decreasing the energy of the treble frequencies output by the speaker 106-6 and/or increasing the energy of the bass frequencies output by the speaker 106-6. As such, adjusting the audio profile of the speaker 106-6 to increase the bass frequency and decrease the treble frequency based on the orientation may increase the audio experience by biasing the speaker 106-6 to a bass audio profile. The detected orientation of the speaker 106-6 may produce relatively less distortion of the bass frequencies than treble frequencies.

In an example, illustrated by convertible computing device 100-4, a sensor may detect that an orientation of an outputting face of a speaker 106-7 is substantially parallel to a work surface and/or a plane of the horizon. The sensor may detect that the outputting face of the speaker 106-7 is facing away from or opposite to the work surface and/or plane of the horizon.

The sensor may detect the orientation of the speaker 106-7 relative to the orientation of the first housing 104-4. For example, the sensor may detect that the angle between the outputting face of the speaker 106-7 and the functional side of the first housing 104-4, about a vertex at the hinge portion connecting the first housing 104-4 and second housing 102-4, is between two hundred and seventy degrees and three hundred and fifty degrees. As such, the speaker 106-7 may be outputting sound waves upward and way from the work surface and the sound may be output toward a user and/or be partially reflected off of the side of the first housing 104-1 that is opposite the functional side of the first housing 104-1 away from the user.

The sensor may detect that the first housing 104-4 may interfere with the sound waves generated by speaker 106-7. In such an example, the audio profile of the speaker 106-7 may be adjusted by decreasing the volume since the soundwaves produced by the speaker 106-7 may be directed toward the user. However, the decrease to the volume may be less than other examples due to the interference from the first housing 104-4. In the example, the audio profile of the speaker 106-7 may be adjusted by increasing the energy of the treble frequencies output by the speaker 106-7 and/or decreasing the energy of the bass frequencies output by the speaker 106-7. The specific treble frequencies subject to the increased energy may be adjusted to account for the interference from the first housing 104-4. As such, adjusting the audio profile of the speaker 106-7 to increase the treble frequency and decrease the bass frequency based on the orientation may increase the audio experience by biasing the speaker 106-7 to a treble audio profile. The detected orientation of the speaker 106-7 may produce relatively less distortion of the treble frequencies than the bass frequencies.

In an example, a sensor may detect that an orientation of an outputting face of speaker 106-8 is substantially parallel to a work surface and/or a plane of the horizon. The sensor may detect that the outputting face of the speaker 106-8 is facing toward the work surface and/or plane of the horizon.

The sensor may detect that the outputting face of the speaker 106-8 is facing away from the outputting face of the speaker 106-7. For example, the outputting face of the speaker 106-8 may be orientated one hundred and eighty degrees from the outputting face of the speaker 106-7.

The sensor may detect that the orientation of the speaker 106-8 relative to the orientation of the first housing 104-4. For example, the sensor may detect that the angle between the outputting face of speaker 106-8 and the functional side of the first housing 104-4, about a vertex at the hinge portion connecting the first housing 104-4 and second housing 102-4, is between two hundred and seventy degrees and three hundred and fifty degrees. As such, the orientation of the speaker 106-8 may be outputting sound waves downward relative to the work surface and the sound may be reflected off the work surface toward a user.

In such an example, the audio profile of the speaker 106-8 may be adjusted by increasing the volume since the soundwaves produced by the speaker 106-8 may be muffled and/or interfered with by the work surface. In the example, the audio profile of the speaker 106-8 may be adjusted by decreasing the energy of the treble frequencies output by the speaker 106-8 and/or increasing the energy of the bass frequencies output by the speaker 106-8. As such, adjusting the audio profile of the speaker 106-8 to increase the bass frequency and decrease the treble frequency based on the orientation may increase the audio experience by biasing the speaker 106-8 to a bass audio profile. The detected orientation of the speaker 106-8 may produce relatively less distortion of the bass frequencies.

The examples described above are non-limiting examples of various orientations of the plurality of speakers 106-1, 106-2, 106-3, 106-4, 106-5, 106-6, 106-7, 106-8. The convertible computing devices 100-1, 100-2, 100-3, 100-4 may be converted between a plurality of configurations. Likewise, the plurality of speakers 106-1, 106-2, 106-3, 106-4, 106-5, 106-6, 106-7, 106-8 may be convertible between a plurality of orientations.

The sensors may periodically and/or substantially continuously detect the orientation of the plurality of speakers 106-1, 106-2, 106-3, 106-4, 106-5, 106-6, 106-7, 106-8. Any time that a change in the orientation of the plurality of speakers 106-1, 106-2, 106-3, 106-4, 106-5, 106-6, 106-7, 106-8 is detected, the audio profile of each of the plurality of speakers 106-1, 106-2, 106-3, 106-4, 106-5, 106-6, 106-7, 106-8 may be updated accordingly.

In some examples, the sensors utilized to detect a configuration of the convertible computing device 100-1, 100-2, 100-3, 100-4 may be the same or different sensors than those utilized to determine the orientation of the plurality of speakers 106-1, 106-2, 106-3, 106-4, 106-5, 106-6, 106-7, 106-8. In some examples, the determined configuration of the convertible computing device 100-1, 100-2, 100-3, 100-4 may be utilized to determine the orientation of the plurality of speakers 106-1, 106-2, 106-3, 106-4, 106-5, 106-6, 106-7, 106-8. For example, the sensors may detect the configuration (e.g., laptop, tablet, tent, presentation, etc.) of the convertible mobile computing device 100-1, 100-2, 100-3, 100-4 and the orientation of the plurality of speakers 106-1, 106-2, 106-3, 106-4, 106-5, 106-6, 106-7, 106-8 may be determined based on the detected configuration.

However, the detection and/or determination of the plurality of speakers 106-1, 106-2, 106-3, 106-4, 106-5, 106-6, 106-7, 106-8 may include more complex determinations than determining which side of a convertible mobile computing device 100-1, 100-2, 100-3, 100-4 is facing up and/or is currently being utilized and accepting input from a user. The multiple possible configurations of the convertible mobile computing device 100-1, 100-2, 100-3, 100-4 introduce variables such as the position of the various housings and/or the sound from other speakers that may interfere with the output of each speaker of the plurality of speakers 106-1, 106-2, 106-3, 106-4, 106-5, 106-6, 106-7, 106-8.

As such, determining the orientation of each of the plurality of speakers 106-1, 106-2, 106-3, 106-4, 106-5, 106-6, 106-7, 106-8 may include making the additional detections and/or determinations from those detections of the orientation of each of the plurality of speakers 106-1, 106-2, 106-3, 106-4, 106-5, 106-6, 106-7, 106-8 relative to the structure and/or output of the convertible mobile computing device 100-1, 100-2, 100-3, 100-4 throughout the various configurations and ranges of orientation associated with each configuration of the convertible mobile computing device 100-1, 100-2, 100-3, 100-4.

Figure 2:
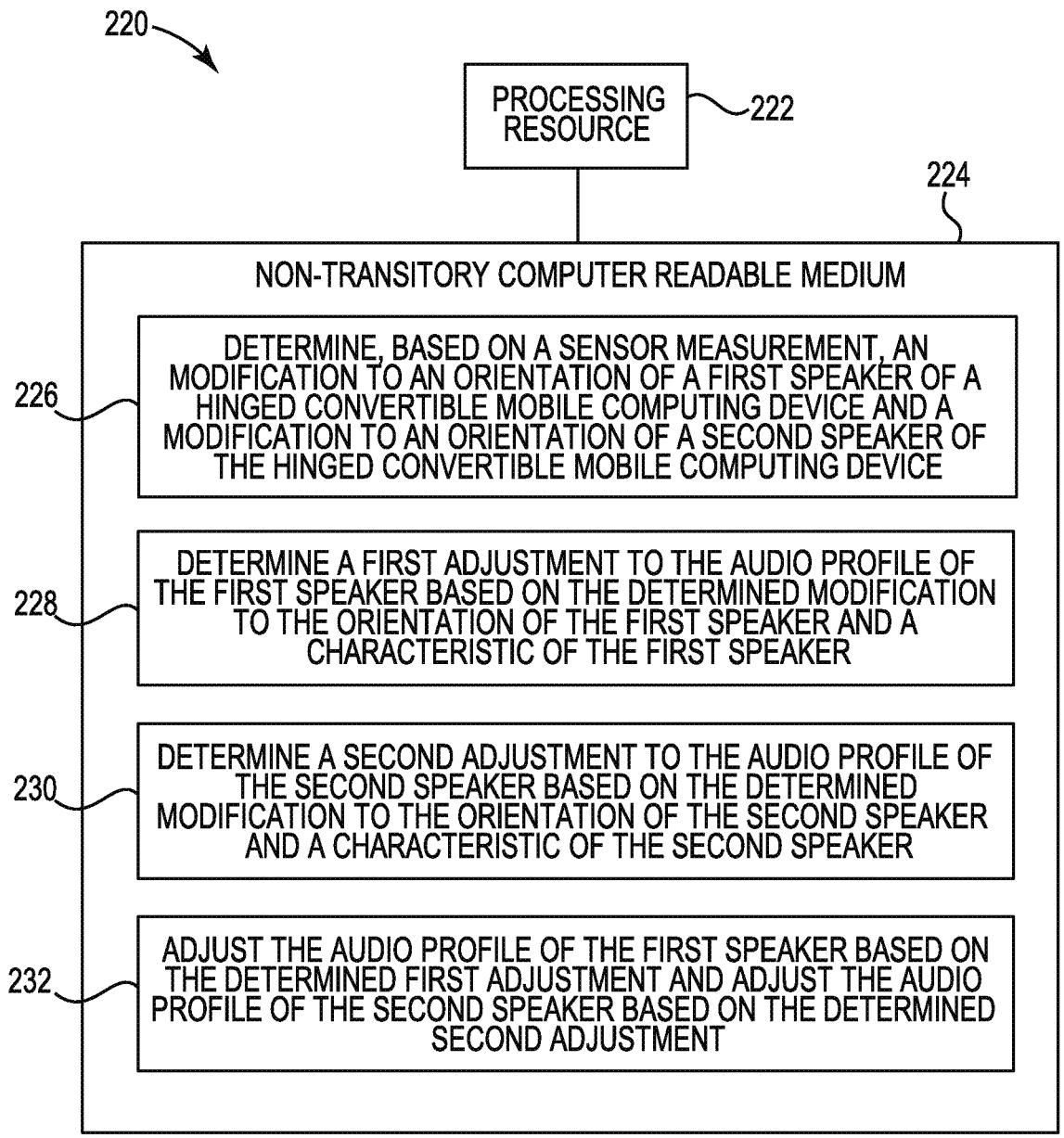
FIG. 2 illustrates a diagram of an example of a processing resource and a non-transitory computer readable medium to enable speaker orientation audio profile adjustments, consistent with the disclosure.

FIG. 2 illustrates a diagram 220 of an example of a processing resource 222 and a non-transitory computer readable medium 224 to enable speaker orientation audio profile adjustments, consistent with the disclosure. A memory resource, such as the non-transitory computer readable medium 224, may be used to store instructions (e.g., 226, 228, 230, 232) executed by the processing resource 222 to perform the operations as described herein. A processing resource 222 may execute the instructions stored on the non-transitory computer readable medium 224. The non-transitory computer readable medium 224 may be any type of volatile or non-volatile memory or storage, such as random access memory (RAM), flash memory, read-only memory (ROM), storage volumes, a hard disk, or a combination thereof. The processing resource 222, non-transitory computer readable medium 224, and/or instructions may be utilized by the convertible computing devices 100-1, 100-2, 100-3, 100-4 and/or may be utilized to perform the method 350.

The example medium 224 may store instructions 226 executable by the processing resource 222 to determine a modification to an orientation of a first speaker of a hinged convertible mobile computing device. The modification to the orientation may be determined based on a sensor measurement. The sensor measurements may indicate an orientation of the first speaker including a direction that the first speaker is facing, the position of the first speaker relative to a work surface, the position of the first speaker relative to a second speaker, the position of the first speaker relative to an opposing housing of the hinged mobile computing device, etc.

Additionally, the instructions 226 may be executable by the processing resource 222 to determine a modification to an orientation of a second speaker of the hinged convertible mobile computing device. The modification to the orientation may be determined based on a sensor measurement. The sensor measurements may indicate an orientation of the second speaker such as a direction that the second speaker is facing, the position of the second speaker relative to a work surface, the position of the second speaker relative to a first speaker, the position of the second speaker relative to an opposing housing of the hinged mobile computing device.

Determining a modification to the orientation of the first speaker and/or the second speaker may include determining a modification to an orientation that is associated with instigating an adjustment to the audio profile of the first speaker and/or second speaker. For example, determining the change in orientation of the first speaker and/or the second speaker may include determining a change that is over a threshold amount of movement, a threshold amount of rotation, and/or a threshold amount of change in direction experienced by the first speaker and/or the second speaker. In an example, determining the change in orientation of the first speaker and/or the second speaker may include determining whether the change results in a potential source of interference (e.g., user, work surface, opposing housing of the hinged convertible mobile computing device, etc.) with the sound waves generated by the speaker.

The example medium 224 may store instructions 228 executable by the processing resource 222 to determine a first adjustment to the audio profile of the first speaker. The first adjustment to the audio profile of the first speaker may be determined based on the determined modification to the orientation of the first speaker.

For example, the sensor may detect that the modification to the orientation of the first speaker includes a switch from an upward facing orientation without a housing component obstructing the sound waves being produced by the first speaker to a downward facing orientation with a work surface obstructing the sounds waves being produced by the first speaker. A first adjustment to the audio profile of the first speaker may be determined based on the switch. In such an example, the first adjustment may include increasing the energy associated with producing bass frequencies with the first speaker and/or decreasing the energy associated with producing treble frequencies with the first speaker.

In another example, if the sensor may detect that the modification to the orientation first speaker includes a switch from a downward facing orientation with a work surface obstructing the sound waves being produced by the first speaker to an upward facing orientation without a housing component obstructing the sound waves being produced by the first speaker, A different first adjustment to the audio profile of the first speaker may be determined. In such an example, the different first adjustment may include increasing the energy associated with producing treble frequencies with the first speaker and/or decreasing the energy associated with producing bass frequencies with the first speaker.

In addition to the determined modification to the orientation of the first speaker, the first adjustment may be determined based on a characteristic of the first speaker. A characteristic of the first speaker may include a type of the first speaker. A type of speaker may be defined by the range of frequencies that it is configured to produce. For example, a type of a first speaker may include a subwoofer, a tweeter, a woofer, etc. Speakers of all types may convert electrical signals to sound waves, however each type of speaker may be configured to perform at particular frequency ranges. The types of speakers may have distinct materials, architectures, and/or form factors to accommodate their particular frequency ranges. For example, a tweeter type speaker may be configured to cover the 2000 Hz to 20,000 Hz frequency range by utilizing dynamic drivers. A woofer type speaker may be configured to cover the 20 Hz to 2000 Hz frequency range using a dynamic drive enclosed in an enclosure, A subwoofer type speaker may be configured to cover the 20 Hz to 200 Hz frequency range.

As such, the first adjustment to the audio profile of the first speaker may be determined and/or modified according to the frequency range that the type of speaker is designed to cover. For example, the first adjustment to the audio profile may be determined such that the frequencies covered by the type of speaker are the frequencies that are increased while those outside the range are decreased or left unchanged.

A characteristic may also include the electrical specifications of the first speaker. For example, the first adjustment may be determined and/or modified based on a voltage supplied to the first speaker and/or an impedance specification of the first speaker. For example, the amount of electrical current that flows to the speakers may be determined based on the impedance specified in ohms (e.g., 4 Ohms, 6 Ohms, 8 Ohms, etc.) associated with the first speaker. As such, the modification to an audio profile may be determined based on the amount of electrical current flows to the first speaker.

The example medium 224 may store instructions 230 executable by the processing resource 222 to determine a second adjustment to the audio profile of the second speaker. The second adjustment to the audio profile of the second speaker may be determined based on the determined modification to the orientation of the second speaker. In addition to the determined modification to the orientation of the second speaker, the second adjustment may be determined based on a characteristic of the second speaker.

In an example, determining the modification to the orientation of the first speaker and the modification to the orientation of the second speaker may include determining a modification to an angle of the first speaker and a modification to an angle of the second speaker relative to a work surface. The angle of the first speaker and the second speaker relative to the work surface may be the angle defined between a ray extending in the plane of the work surface and a ray extending in the plane of the outputting face of the first speaker or second speaker about a vertex defined at the hinge mechanism.

In another example, determining the modification to the orientation of the first speaker and the modification to the orientation of the second speaker may include determining a modification of an angle of the first speaker and a modification of an angle of the second speaker relative to an opposing base of the hinged convertible mobile computing device. The angle of the first speaker and the second speaker relative to the opposing base of the hinged convertible mobile computing device may be the angle defined between a ray extending through an opposing base and a ray extending in the plane of the outputting surface of the first or second speaker about a vertex defined at the hinge mechanism.

Determining the first and second adjustment to the audio profiles of the first and second speaker may be based on speaker orientation-specific and/or speaker characteristic-specific equalizer settings for the first speaker and the second speaker. The speaker orientation-specific and/or speaker characteristic-specific equalizer settings may be established through a training protocol where adjustment to an equalizer is performed and saved through each of a plurality of orientations of the first speaker and the second speaker. The speaker orientation-specific and/or speaker characteristic-specific equalizer setting for the first speaker and/or the second speaker may be selected by matching the detected orientation of the first speaker and second speaker to equalizer settings specific to the detected characteristic and/or orientation of the first speaker and the second speaker.

The example medium 224 may store instructions 232 executable by the processing resource 222 to adjust the audio profile of the first speaker based on the determined first adjustment. The instructions 232 may be executable by the processing resource 222 to adjust the audio profile of the second speaker based on the determined second adjustment, Adjusting the audio profile may include increasing and/or decreasing the energy associated with producing various frequency ranges in the sound wave at the corresponding speaker and/or increasing or decreasing the volume associated with producing various frequency ranges in the sound wave at the corresponding speaker.

Figure 3:
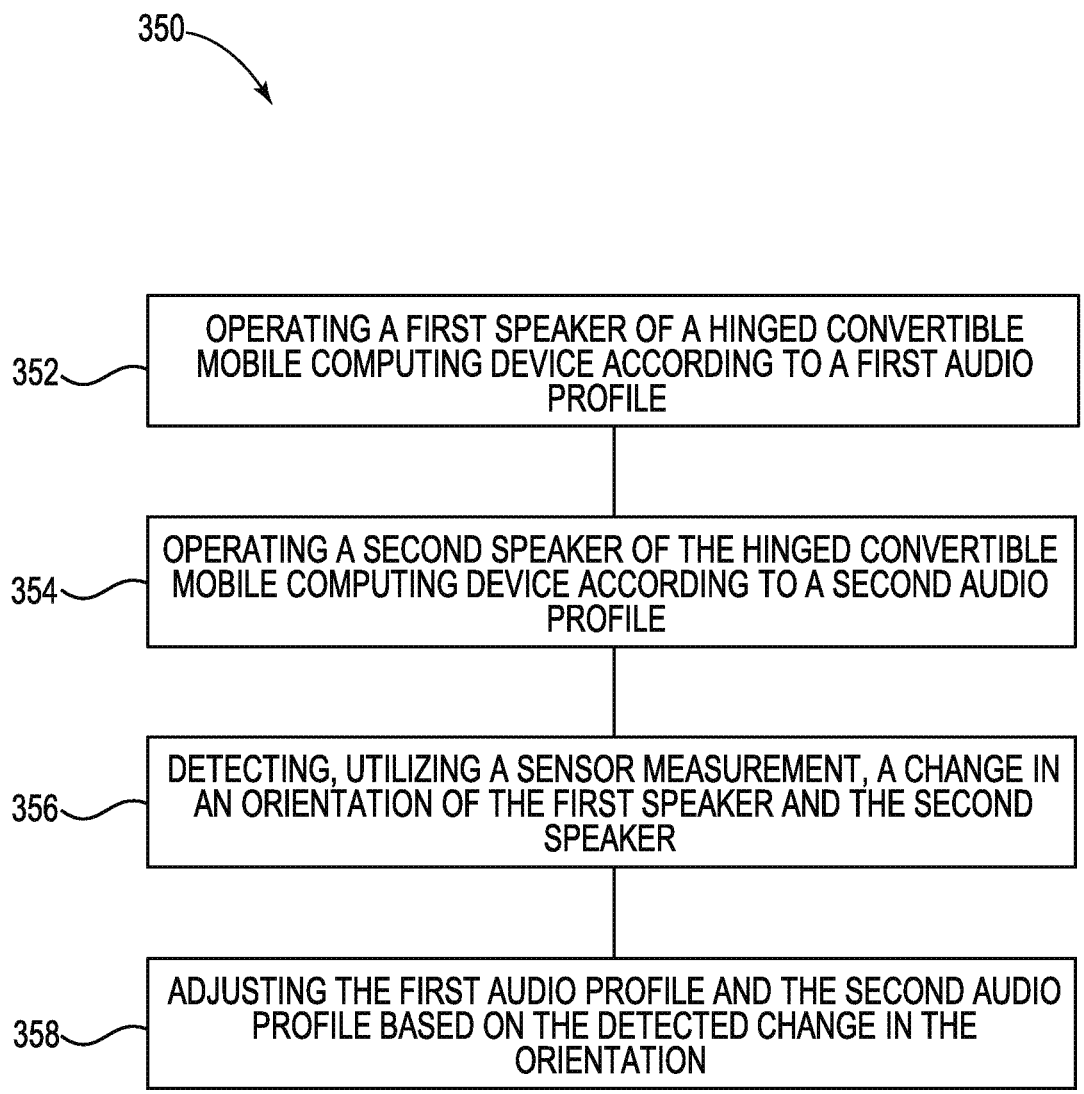
FIG. 3 illustrates a flow diagram of an example of a method to enable speaker orientation audio profile adjustments, consistent with the disclosure.

FIG. 3 illustrates a flow diagram of an example of a method 350 to enable configuration based operation modes consistent with the disclosure. At 352; the method 350 may include operating a first speaker of a hinged convertible mobile computing device according to a first audio profile. Operating the first speaker according to the first audio profile may include converting electronic signals to sound waves having an energy frequency profile defined by equalizer settings of a first audio profile.

In some examples, this may include operating the first speaker according to a bass audio profile or according to a treble audio profile. Operating the first speaker according to a bass audio profile may include producing strictly the bass frequency ranges of the electrical signal and/or producing the bass frequency ranges of the electrical signal at a higher energy level than treble frequency ranges of the electrical signal, Operating the first speaker according to a treble profile may include producing strictly the treble frequency ranges of the electrical signal and/or producing the treble frequency ranges of the electrical signal at a higher energy level than the base frequency ranges of the electrical signal.

At 354, the method 350 may include operating the second speaker of the hinged convertible mobile computing device according to a second audio profile. For example, the second speaker may be operated according to a bass audio profile or a treble audio profile. Both the bass audio profile and the treble audio profile may be defined based on adjustable equalizer settings configured during an audio profile training period.

At 356, the method 350 may include detecting, utilizing a sensor measurement, a change in an orientation of the first speaker and the second speaker. Detecting the change in the orientation of the first speaker and the change in the orientation of the second speaker may include detecting that outputting face of the first and/or second speaker has changed its position relative to a work surface, an opposing housing of the hinged convertible mobile computing device, relative to a user, relative to the horizon, relative to another speaker, etc.

At 358, the method 350 may include adjusting the first audio profile based on the detected change in the orientation of the first speaker and the second speaker. The second audio profile of the second speaker may also be adjusted based on the change in the orientation of the first speaker and the second speaker.

The modification to the first audio profile and the modification to the second audio profile may be determined based on an orientation-specific audio profile corresponding to the speaker and the speakers detected orientation. The orientation-specific audio profiles may include orientation and/or speaker specific equalizer settings. An adjustable equalizer may be presented to a user. The adjustable equalizer may be adjustable to define a plurality of orientation-specific audio profiles for the first speaker and a plurality of orientation-specific audio profiles for the second speaker In some examples, adjusting the first audio profile may include adjusting the first audio profile to an orientation-specific audio profile of the plurality of orientation-specific audio profiles for the first speaker based on the detected change in the orientation of the first speaker. In some examples, adjusting the first audio profile and a second audio profile may include adjusting the first audio profile to the second audio profile and altering the second audio profile to the first audio profile based on the detected change in the orientation. For example, a first speaker may be initially operated according to a treble profile. The first speaker may be oriented facing away from a work surface with no obstructions to the sound waves. The second speaker may be initially operated according to a bass profile. The second speaker may be oriented facing toward the work surface with the work surface obstructing the sound waves. A change in the orientation of the first speaker from the first orientation to an orientation facing toward the work surface with the work surface obstructing the sound waves may be detected. A change in the orientation of the second speaker from the second away from the work surface may be detected. Therefore, the first audio profile may be adjusted to the second audio profile and the second audio profile may be adjusted to the first audio profile. For example, the first speaker may be modified from operating according to a treble profile to operating according to a bass profile and vice versa.

In this manner, a convertible mobile computing device may readily adjust an audio profile of each of its speakers based on the orientation of the speakers. This may allow for an adaptable audio experience that tailors the sound output of the device to the orientation of the speakers. The adjustments to the audio profiles may allow for changed in the output of the speakers to accommodate for interference to the sound waves posed by opposing housings of the device, other speakers, the work surface, etc. Additionally, an adjustable equalizer may allow for the creation and implementation of orientation-specific audio profiles for each of the device speakers that are adjusted by and tailored to a user.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. A "plurality of" is intended to refer to more than one of such things.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

Further, as used herein, "a number of" an element and/or feature can refer to one or more of such elements and/or features.

What is claimed:

1. A mobile computing device comprising:
a first housing coupled to a second housing, wherein the first housing and the second housing are articulable to a plurality of configurations;
a plurality of speakers;
a sensor to detect a respective orientation of each of the plurality of speakers; and
a memory resource comprising executable instructions to differentially adjust each respective audio profile of each of the plurality of speakers based on the detected respective orientation of each of the plurality of speakers.

2. The mobile computing device of claim 1, wherein the first housing is coupled to the second housing via a hinge mechanism.

3. The mobile computing device of claim 1, wherein the sensor is a first accelerometer located in the first housing and a second accelerator in the second housing.

4. The mobile computing device of claim 1, wherein the executable instructions to adjust the audio profile of each of the plurality of speakers include instructions executable to adjust a bass frequency of each of the plurality of speakers.

5. The mobile computing device of claim 1, wherein the executable instructions to adjust the audio profile of each of the plurality of speakers include instructions executable to adjust a treble frequency of each of the plurality of speakers.

6. The mobile computing device of claim 1, wherein the executable instructions to adjust the audio profile of each of the plurality of speakers include instructions executable to adjust a volume of each of the plurality of speakers.

7. A non-transitory computer readable medium containing instructions executable by a processor to cause the processor to:
determine, based on a sensor measurement, a modification to an orientation of a first speaker of a hinged convertible mobile computing device and a modification to an orientation of a second speaker of the hinged convertible mobile computing device;
determine a first adjustment to an audio profile of the first speaker based on the determined modification to the orientation of the first speaker and a characteristic of the first speaker;
determine a second adjustment to the audio profile of the second speaker based on the determined modification to the orientation of the second speaker and a characteristic of the second speaker; and
adjust the audio profile of the first speaker based on the determined first adjustment and adjust the audio profile of the second speaker based on the determined second adjustment.

8. The non-transitory computer-readable medium of claim 7, wherein the characteristic of the first speaker includes a speaker type of the first speaker.

9. The non-transitory computer-readable medium of claim 7, wherein the characteristic of the first speaker includes an impedance specification of the first speaker.

10. The non-transitory computer-readable medium of claim 7, comprising the instructions executable by the processor to determine the modification to the orientation of the first speaker and the modification to the orientation of the second speaker by determining a modification to an angle of the first speaker and a modification to an angle of the second speaker relative to a work surface.

11. The non-transitory computer-readable medium of claim 7, comprising the instructions executable by the processor to determine the modification to the orientation of the first speaker and the modification to the orientation of the second speaker by determining a modification of an angle of the first speaker and a modification of an angle of the second speaker relative to an opposing base of the hinged convertible mobile computing device.

12. A method comprising:
operating a first speaker of a hinged convertible mobile computing device according to a first audio profile;
operating a second speaker of the hinged convertible mobile computing device according to a second audio profile;
detecting, utilizing a sensor measurement, a change in an orientation of the first speaker and the second speaker; and
adjusting the first audio profile and the second audio profile based on the detected change in the orientation.

13. The method of claim 12, comprising presenting an adjustable equalizer adjustable to define a plurality of orientation-specific audio profiles for the first speaker and a plurality of orientation-specific audio profiles for the second speaker.

14. The method of claim 13, comprising adjusting the first audio profile to an orientation-specific audio profile of the plurality of orientation-specific audio profiles for the first speaker based on the detected change in the orientation of the first speaker.

15. The method of claim 12, comprising adjusting the first audio profile to the second audio profile and altering the second audio profile to the first audio profile based on the detected change in the orientation.

* * * * *